United States Patent

Birkmayer et al.

Patent Number: 5,467,414
Date of Patent: Nov. 14, 1995

[54] DEVICE FOR GENERATING FEEDBACK SIGNALS TO REGULATE OPTICAL MONITORING CIRCUITS (PLL)

[75] Inventors: Wolfram Birkmayer, Mazhuette-Haidorf, Germany; Michael J. Wale; Colin Edge, both of Northhamptonshire, Great Britain

[73] Assignees: Deutache Aerospace AG, Germany; GEC-Marconi, Ltd., United Kingdom

[21] Appl. No.: 244,057
[22] PCT Filed: Sep. 16, 1993
[86] PCT No.: PCT/EP93/02505
§ 371 Date: Aug. 31, 1994
§ 102(e) Date: Aug. 31, 1994
[87] PCT Pub. No.: WO94/07312
PCT Pub. Date: Mar. 31, 1994

[30] Foreign Application Priority Data

Sep. 16, 1992 [DE] Germany ............... 42 30 932.8

[51] Int. Cl.⁶ ............... G02B 6/1; G02F 1/035
[52] U.S. Cl. ............... 385/3
[58] Field of Search ............... 385/2–12, 14, 385/15, 31, 40, 61; 372/26, 28; 359/323, 258, 152, 153, 154, 163, 173, 179, 188, 195, 245, 246, 254

[56] References Cited

U.S. PATENT DOCUMENTS 4,832,431  5/1989  Nolting et al. ............... 385/3 X
5,109,441  4/1992  Glaab ............... 385/3
5,168,534  12/1992  McBrien et al. ............... 385/3
5,208,817  5/1993  Kao et al. ............... 372/26 X
5,347,601  9/1994  Ade et al. ............... 385/14 X
5,408,544  4/1995  Seino ............... 385/4 X

OTHER PUBLICATIONS

"Optical BFN for Telecom Satellites and/or SAR Applcations: Analysis and Results," W.Ss.> Birkmayer et al., Proc. ESA Workshop on Advanced Beamforming Networks for Space Applications, Nov. 1991, ESA Publication WPP-030.

"Coherent Optical Techniques in Antenna Beamforming for Satellite Communications," M. J. Wale et al., Colloquim on Optical Intersatellite Links and Onboard Techniques, IEEE, London Jan. 12, 1990 (IEE Digest 1990/8). pp. 17/1–17/4.

Primary Examiner—Akm E. Ullah
Attorney, Agent, or Firm—Evenson, McKeown, Edwards & Lenahan

[57] ABSTRACT

An optical device for generating a modulated, phase controlled RF carrier by combining a modulated optical carrier signal having a first frequency with an unmodulated optical reference signal having a second frequency. The modulated and unmodulated signals are polarized on orthogonal axes and are transmitted in a single optical waveguide. Modulation of the optical carrier is performed, for example, by means of an integrated optical device which modulates only one polarization direction.

8 Claims, 3 Drawing Sheets

DEVICE FOR GENERATING FEEDBACK SIGNALS TO REGULATE OPTICAL MONITORING CIRCUITS (PLL)

BACKGROUND AND SUMMARY OF THE INVENTION

The invention relates to a device for modulated optical signals for coherent optical generation of modulated phase-controlled RF charge carriers and for summing such signals on a plurality of optical carriers.

Optical devices of this kind have been disclosed by the following publications: Wale, M. J. and Birkmayer, W. S. "Coherent optical techniques in antenna beamforming for satellite communications," Colloquium on Optical Intersatellite Links and Onboard Techniques, IEEE, London, Jan. 12, 1990 (IEE Digest 1990/8), as well as Birkmayer, W. S. and Wale, M. J. "Optical BFN for telecom satellites and/or SAR applications; analysis and results," in Proc. ESA Workshop on Advanced Beamforming networks for Space Applications, November 1991, ESA publication WPP-030. FIG. 3 shows the block diagram of an example of an optical beamforming network in which the optical device is incorporated into a combiner. In the example shown, an optical carrier is superimposed with two modulated optical carriers. In particular, the publications discuss the problem that occurs in conjunction with the use of coherent optical methods to generate and control several modulated RF carriers, e.g., in producing antenna lobes in phase-controlled antennas.

For the arrangement with an RF carrier, the required RF signal is obtained by mixing two optical carriers with frequencies $w\omega_1$, $\omega_{LO}$, separated by the required superimposition frequency $\omega_{RF}$. Since any phase or amplitude encoding on $\omega_1$ or $\omega_{LO}$ is transferred by the mixing process in the optical receiver directly to the RF carrier with a frequency $\omega_{RF}$, phase or amplitude control can be used in the optical range to control the corresponding properties of the RF signal. This is the source of the advantages in the described system presented in the above publications. The basic configuration, as used to control phase and amplitude in several phase-controlled antenna elements, is shown in FIG. 3. Here the two optical carriers with frequencies $\omega_1$, $\omega_{LO}$ are generated by a pair of lasers operating under the control of an electronic monitoring circuit (PLL). The latter monitors the relative frequency and/or the phase of the RF carrier and transmits a feedback signal to one or both lasers, so that a constant frequency ratio, in some cases a constant phase ratio as well, is maintained between the measured RF carrier and a reference frequency from an external control oscillator.

The above-mentioned publications describe an embodiment which is concerned primarily with providing an optical output for the measurement process, with this output having certain properties. In order to permit accurate RF phase control, the temperature coefficient of the phase of the differential frequency applied to the output must be as low as possible and the control signal must travel a path other than the one followed by the antenna signals which are controlled independently with the smallest possible expense. The signal applied to the monitoring output must not be highly modulated, since data modulation sidebands interfere with the operation of the feedback control circuit of the laser for phase/frequency and result in coupling between data modulation and the controlled RF frequency or phase. In the special case of a modulation circuit with suppressed carrier, such as QPSK, the carrier is not present in the spectrum of the modulated signal at all and must be regenerated in the laser control circuit, for example by nonlinear signal processing. Consequently, however, the electronics must be designed in a very costly fashion, despite which the accuracy and temperature stability of the system can be considerably adversely affected.

The goal of the present invention is to provide an optical device of the species recited at the outset in which the previous cost of specially designed optical and mechanical components and the consumption of electrical power are considerably reduced and the signal/noise ratio of the feedback signal is drastically improved.

This object is achieved according to the invention by providing a pure carrier output without modulation; for this purpose the optical signals of two orthogonal polarization states are processed separately, with the optical processing functions being performable using conventional prisms, polarization beamsplitters, and polarizers or by means of integrated optics. (The latter is particularly advantageous as far as power, sturdiness, and stability against environmental factors are concerned.) One of the two orthogonal polarization states is used to transmit the optical signal in an unmodulated state and the other serves to transmit the modulated optical carrier. This can be accomplished by using an integrated optical device, a phase modulator for example, which modulates only one polarization direction. For this purpose a device is used which is based on the electro-optical effect in semiconductor materials of the main groups III-V such as GaAs/AlGaAs, InP/LnGaAs, or InP/GaAsP. By using a vertical electrical scattering field in a hollow conductor, manufactured for example on a wafer with orientation <001>, the TE-polarized wave is modulated by the electro-optical effect $\tau_{41}$ while the TM wave undergoes no electro-optical modulation whatsoever. It should be mentioned in this connection that other modulation effects that influence the TM mode, which result for example from the movement of charge carriers, can be kept low by selecting suitable parameters in designing the device.

Other objects, advantages and novel features of the present invention will become apparent from the following detailed description of the invention when considered in conjunction with the accompanying drawings.

DETAILED DESCRIPTION OF THE DRAWINGS

Figure 1:
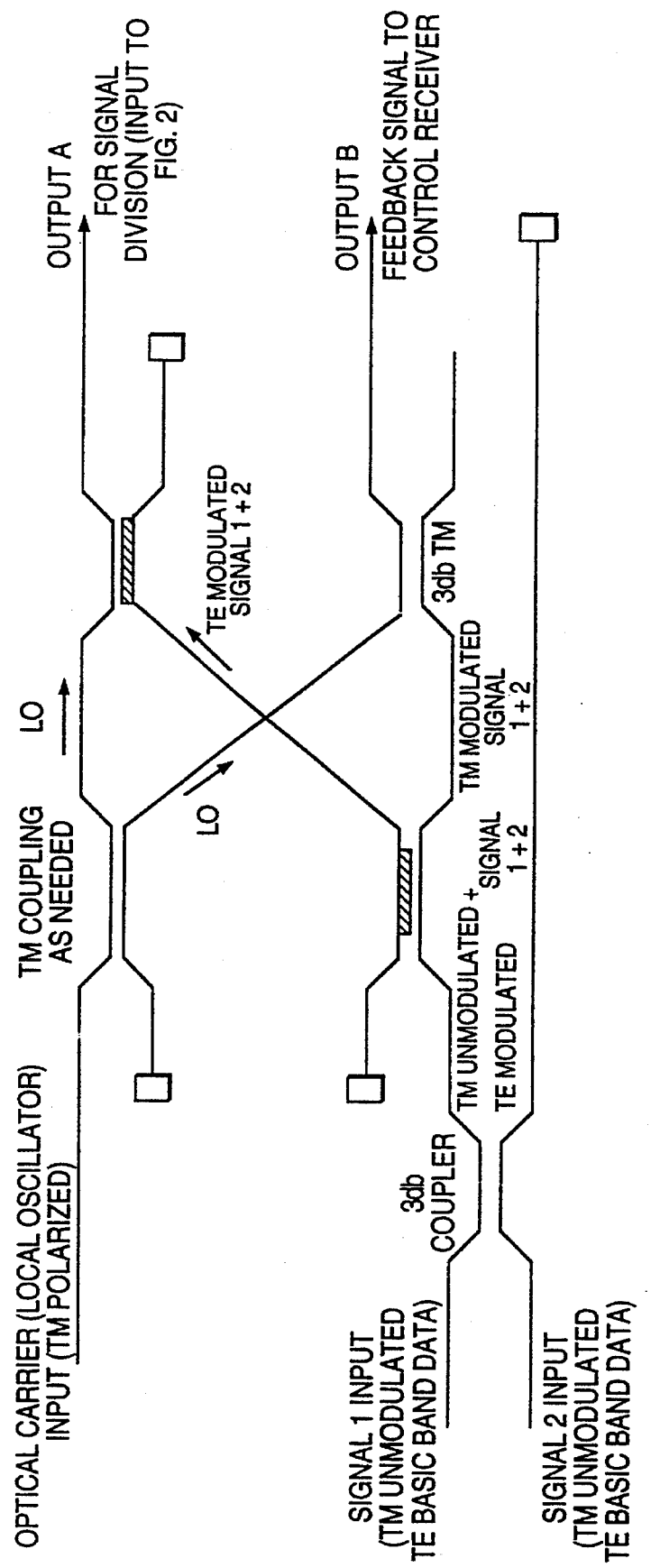
FIG. 1 is a circuit diagram of the integrated optical circuit.

The general idea of the invention entails, in producing the optical device, providing a pure carrier output without modulation and for this purpose processing separately the optical signals of two orthogonal polarizations, with the optical processing functions being beamsplitters, and polarizers or by means of integrated optics. The latter is particularly advantageous as far as power, sturdiness, and stability against environmental factors are concerned.

One of the two orthogonal polarization states is used to transmit the optical signal in an unmodulated state and the other serves to transmit the modulated optical carrier. This can be accomplished by using an integrated optical device, a phase modulator for example, which modulates only one polarization direction. For this purpose a device is used which is based on the electro-optical effect in semiconductor materials of the main groups III–V such as GaAs/AlGaAs, InP/LnGaAs, or InP/GaAsP. By using a vertical electrical scattering field in a hollow conductor, manufactured for example on a wafer with orientation <001>, the TE-polarized wave is modulated by the electro-optical effect $\tau_{41}$ while the TM wave undergoes no electro-optical modulation whatsoever.

It should be mentioned in this connection that other modulation effects that influence the TM mode, which result for example from the movement of the charge carriers, can be kept low by selecting suitable parameters in designing.

In order to obtain an RF waveform, the signal $\omega_{LO}$ coming from the modulator is superimposed with the reference signal $\omega_{LO}$. A polarization analysis is performed to isolate the desired signal component, noting in this connection that only the component that is resolved along a common polarization axis generates a beat note, since there is no optical interference between signals with orthogonal polarization. Therefore an optical reference signal $\omega_{LO}$ with components in both polarizations is provided. By resolving the polarization along the TE axis of the modulator, we obtain the data-modulated optical carrier for the signal transmission, while through resolution along the TM axis, we obtain the unmodulated carrier which can be used for frequency or phase control.

In using the measures described above in practice, birefringence of the components used and especially the birefringence of the integrated optical hollow conductors must be taken into account, which may not be precisely determinable in each individual case. The simplest solution in which a linearly polarized reference wave $\omega_{LO}$ which has, relative to the coordinate system, the orientation with which TE or TM waves polarized along the coordinate axes are combined, is therefore difficult to achieve. In case of birefringence, the reference signal would usually assume an elliptical polarization in such a system and thus adversely affect the orthogonality which is required for the derivation of two independent signal components.

Figure 2:
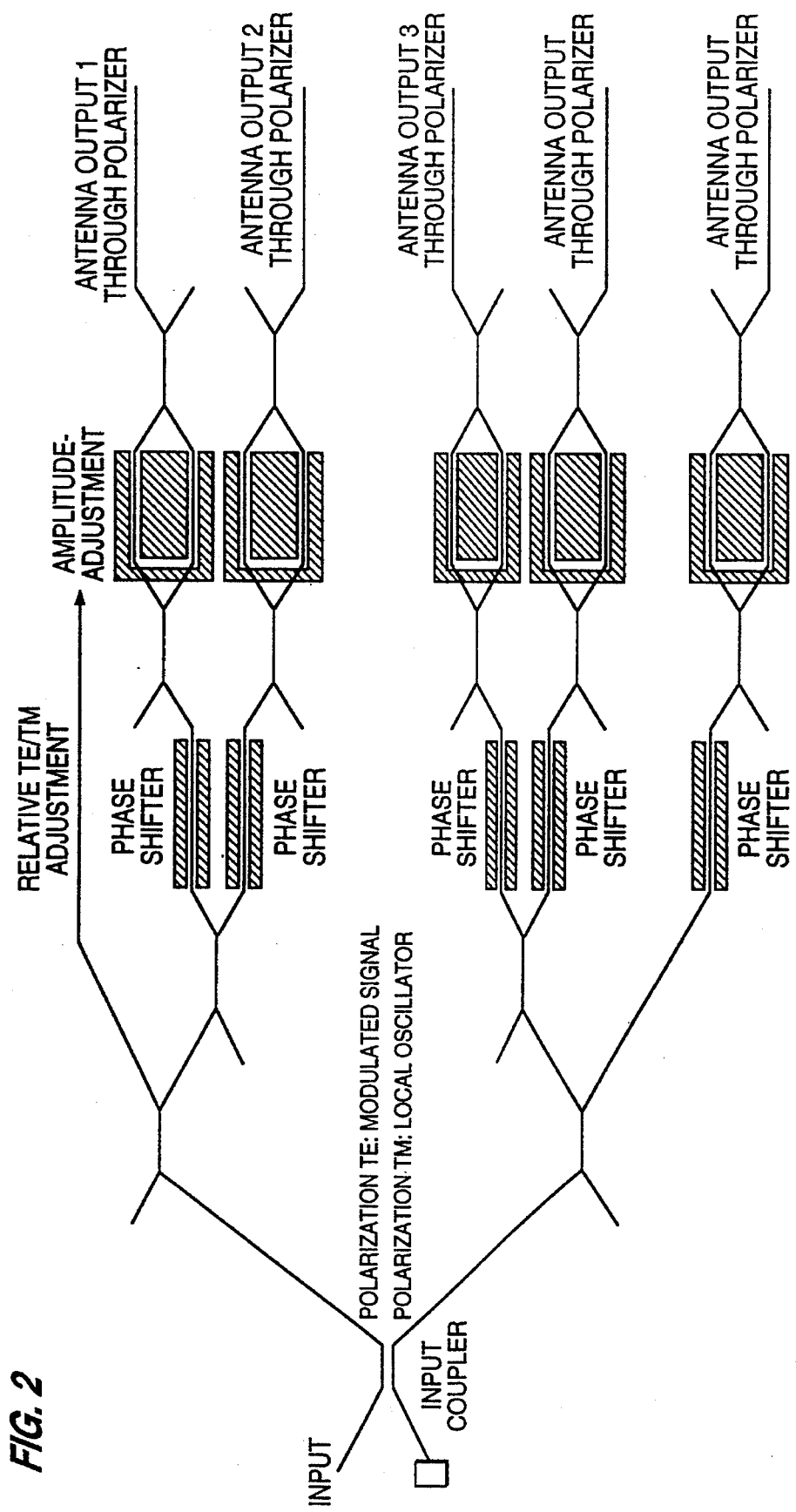
FIG. 2 is a circuit diagram of one embodiment of the individual phase and amplitude control.
Figure 3:
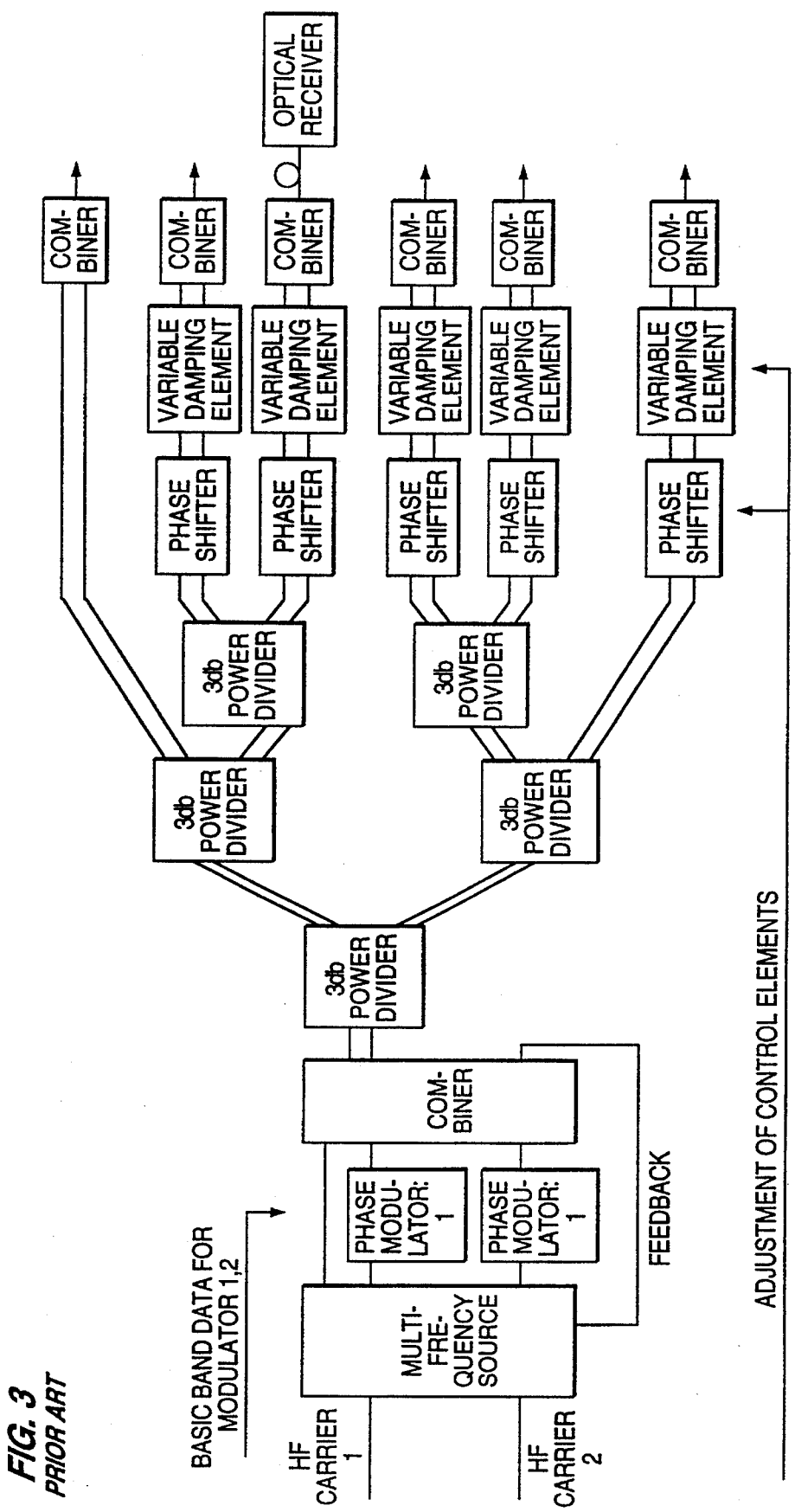

The above disadvantage is avoided in the somewhat more complex embodiment shown in FIG. 1. Here, upper output A supplies the modulated signal channels in which an individual phase and amplitude control is required, as shown in FIG. 2 for example. Lower output B is directed toward the optical receiver which supplies the unmodulated RF reference carrier for the laser feedback control circuit. The configuration shown in FIG. 2 optionally provides a balanced output for a dual detector receiver which is used to obtain a higher signal level at this receiver and simultaneously to suppress laser noise.

The network shown in FIG. 1 is manufactured as an integrated optical circuit from a suitable medium such as lithium niobate, gallium arsenide, InP, or silicon. In order to ensure sufficiently accurate phase guidance between signals with orthogonal polarization, it is advantageous to use a material system and a crystal orientation in which the birefringence of the basic material is zero, since in this case the temperature coefficient of the birefringence is likewise very small. This condition is satisfied with every orientation of GaAs, InP, or silicon as well as with LiNbO$_3$ cut in the X direction and with a propagation orientation Z.

The basic components of the device that are required for the network shown in FIG. 1 are directional couplers and polarization mode splitters. The directional coupler is the classic passive component, as is generally known, except that here it is used as a beamsplitter with the required splitting ratio. The required rotation of signal polarizations between the modulator device at the network input and the network itself can be accomplished by a connecting fiber or by a polarization device integrated monolithically into the other elements of the device. Suitable rotational elements are generally available and there is also the possibility of combining in the embodiment described above all of the necessary elements into a single integrated optoelectronic circuit.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An optical device for generating modulated optical signals for coherent optical generation of a modulated, phase controlled RF carrier, said optical device comprising:

an optical waveguide;

a modulator optically coupled to said waveguide, said modulator performing at least one of phase modulation and frequency modulation of optical signals input thereto, along only a first polarization axis;

means for transmitting an optical carrier signal having a first frequency and an optical reference signal having a second frequency together in said optical waveguide, said optical carrier signal being polarized along said first polarization axis and said optical reference signal being polarized along a second polarization axis inclined at an angle relative to said first axis;

means for generating a reference signal with suppressed modulation by polarization analysis of the optical wave $\omega_1$, which carries modulated and unmodulated components on orthogonal polarization axes, and superimposing the unmodulated components with the optical reference signal $\omega_{LO}$; and means for generating a fully modulated optical carrier signal having a frequency $\omega_1$ by polarization analysis of the optical wave $\omega_1$ and superimposition of the modulated component with the optical reference signal $\omega_{LO}$.

2. Optical device according to claim 1 wherein the modulator modulates only one of said polarization states.

3. Optical device according to claim 1 wherein said means for generating a reference signal with suppressed modulation comprises a waveguide made on a wafer with orientation <001>, a vertical electrical control field being generated therein.

4. Optical device according to claim 1 further comprising a device for generating an optical reference signal $\omega_{LO}$ with components in both polarization states.

5. Optical device according to claim 1 further comprising a symmetrical output for a double detector receiver.

6. Optical device according to claim 1 comprising an integrated optical circuit made from a material selected from the group consisting of LiNbO$_3$, GaAs, or InP, and wherein double refraction of the basic material is equal to zero.

7. Optical device according to claim 1 wherein a directional coupler, with an asymmetric metal coating is used as a beamsplitter.

8. Optical device according to claim 1 wherein to generate a rotation of signal polarizations, a connecting fiber or a polarization rotation device is integrated between the modulator at the network input and the network.

* * * * *